Oct. 27, 1925.
W. M. CUTLER
1,559,033
CHUCK
Filed July 8, 1921  2 Sheets-Sheet 1
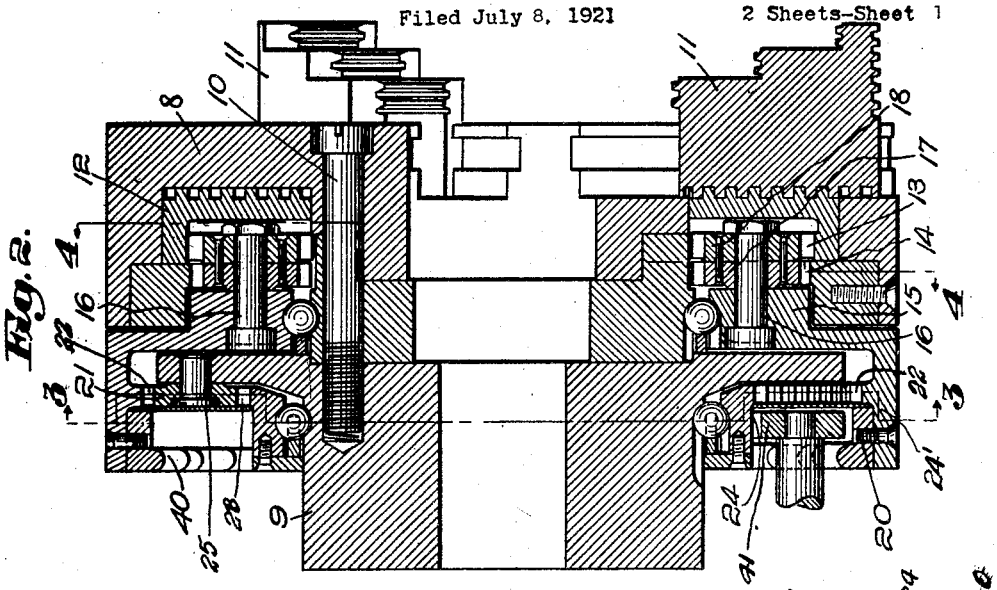
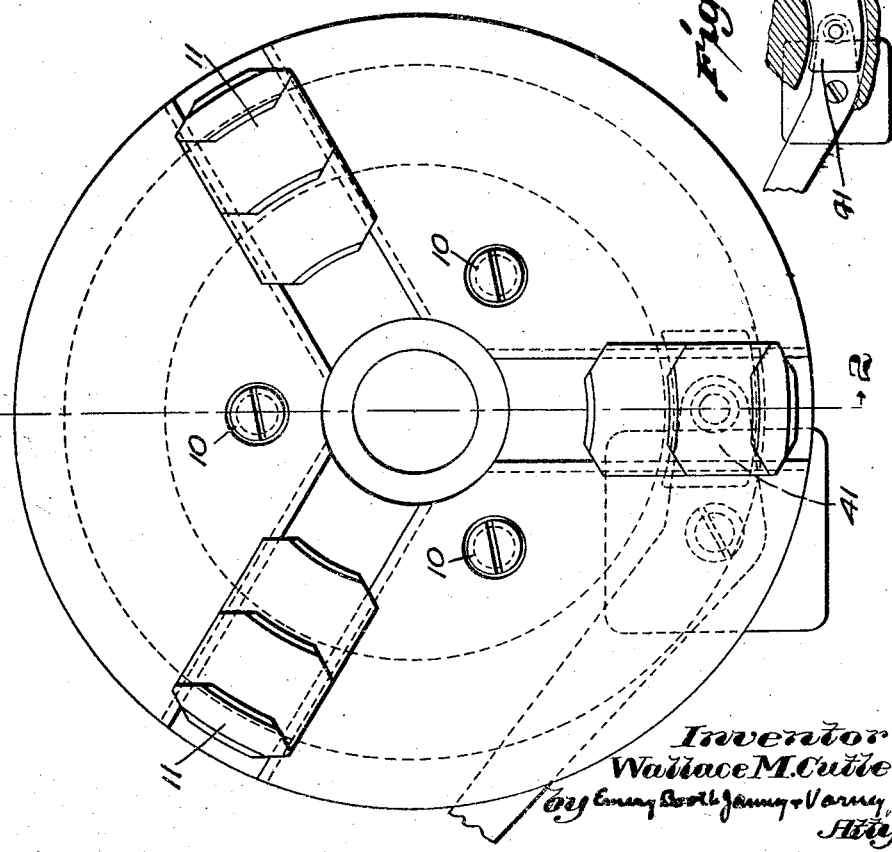
Inventor
Wallace M. Cutler Oct. 27, 1925.  
W. M. CUTLER  
1,559,033  
CHUCK  
Filed July 8, 1921  
2 Sheets-Sheet 2

Inventor:  
Wallace M. Cutler.

Patented Oct. 27, 1925.

1,559,033

UNITED STATES PATENT OFFICE.

WALLACE M. CUTLER, OF WINDSOR LOCKS, CONNECTICUT.

CHUCK.

Application filed July 8, 1921. Serial No. 483,260.

*To all whom it may concern:*

Be it known that I, WALLACE M. CUTLER, a citizen of the United States, and resident of Windsor Locks, in the county of Hartford, State of Connecticut, have invented an Improvement in Chucks, of which the following description, in connection with the accompanying drawings, is a specification, like characters on the drawings representing like parts.

This invention pertains to improvements in chucks. It is among the objects of the invention to provide a chuck of superior construction in which the jaws may be opened and closed while the chuck is rotating with the lathe spindle or at rest.

In the drawings, which show a preferred form of one embodiment of my invention:—

Figure 1 is a front elevation of a preferred form of chuck;

Fig. 2 is a section on the line 2—2 of Fig. 1;

Fig. 5 illustrates a portion of the brake mechanism.

Figure 4:
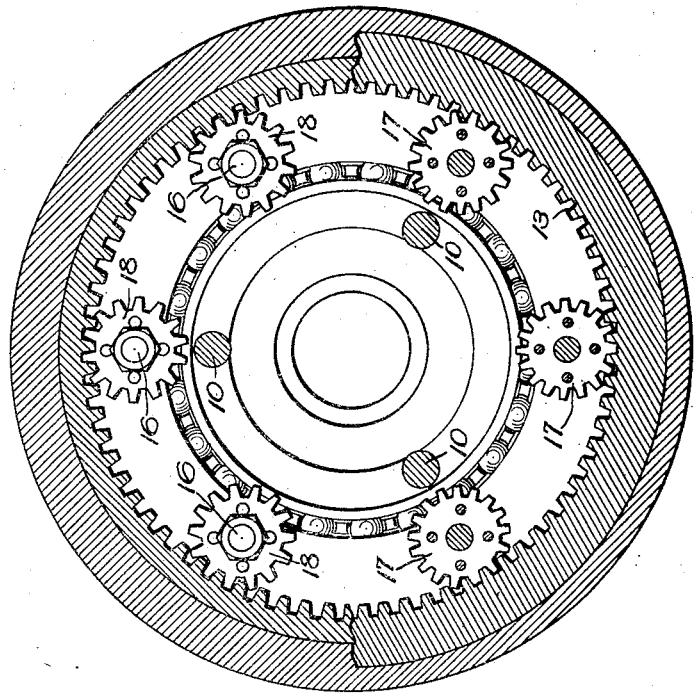
Fig. 4 is a section on the line 4—4 of Fig. 2.
Figure 3:
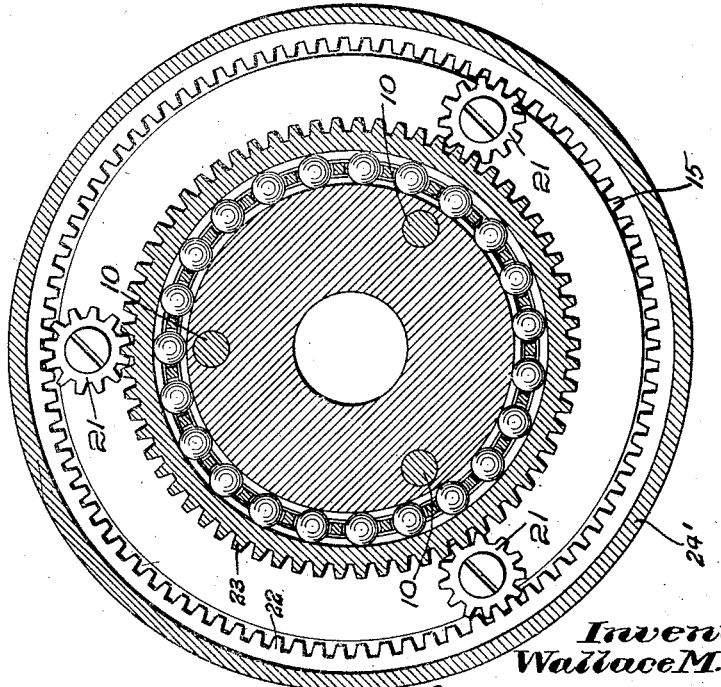
Fig. 3 is a section on the line 3—3 of Fig. 2.

Referring to the drawings and to the preferred form of my invention selected for illustrative purposes, I have shown a chuck including a body which may, as illustrated, include a face portion 8, and hub portion 9 held together in any suitable way, typified by the bolts 10. The face portion 8 of the chuck body provides slots preferably radial, as shown, in which are slidably mounted jaws 11, which may be of any suitable or usual construction. In the preferred form of chuck illustrated, these jaws are actuated toward and from the work by a part having provision for turning movement relative to the chuck body 8, this part preferably, as illustrated, taking the form of a scroll 12 cooperating with the chuck jaws in the usual manner of scroll chucks. Features of my invention are, however, useful in connection with various other types of chuck-operating means than the scroll illustrated. The chuck-operating part 12 illustrated carries a gear 13, herein shown as of the internal type. The chuck body carries a gear 14, which is also preferably as illustrated of the internal type. Rotatable about the axis of the chuck body, I have provided a ring 15 carrying studs 16 on which are mounted differential pinions 17, 18 meshing respectively with the internal gears 14, 13 and providing differential ratios therewith so that rotation of the ring 15 relative to the chuck body will effect relatively slow movement with great pressure, of the gear 13 and chuck jaw-operating part 12, relative to the chuck body. The mechanism hereinbefore described is somewhat similar to that described in connection with my copending application Serial No. 483,258, filed July 8, 1921.

I will now describe the preferred form of mechanism for actuating the ring 15 in its rotary movement relative to the chuck body. Rotation of the ring 15 relative to the chuck body in one direction may, of course, be effected by a simple braking movement which retards or decelerates rotation of the ring 15 while the chuck body is being rotated on the lathe spindle. This retardation may conveniently be provided by the brake bearing against the ring 15 and herein illustrated as bearing against the interior surface 20 of said ring. To provide for rotation of said ring relative to the chuck body in the same sense of rotation in which the chuck body is rotating, I have provided planetary means typified by the planetary pinions 21 and meshing with the internal gear 22 on the ring 15 and with the external gear 23 which is rotatable relative to the chuck body and which provides a braking surface 24, retardation of which by the brake mechanism illustrated will, acting through the planetary pinion 21, accelerate rotation of the internal gear 22 and of the ring 15 so that it will rotate faster than the chuck body is being rotated, and thus produce rotation of the ring 15 relative to the chuck body in a direction opposite to that which is produced by retardation of the ring 15. Acceleration and retardation of the ring 15 actuates, through the differential mechanism hereinbefore described, rotation of the chuck actuating part 12 and therefore actuates the jaws toward or from the work, as desired.

In the preferred form of my invention illustrated, the planetary pinions 21 are held in place by a ring plate 25, which fills in the space between the part carrying the external gear 23 and the interior of the flange portion 24' of the ring 15. To provide for actuation of the chuck jaws while the lathe spindle is not rotating, I have provided a convenient corrugated gripping surface 40 extending inwardly from the flange 24' attached to the ring 15.

When it is desired to operate the chuck jaws in one direction, the brake 41, carried by a lever fulcrumed on the lathe, as indicated in Fig. 1, is pressed inwardly against the surface 24, thereby retarding or stopping rotation of the gear 23 with the chuck body. The pinions 21, meshing with the gear 23, must then rotate about their own axes and move bodily in a planetary path about the axis of the chuck, this because they mesh with the internal gear 22; the gear 22 will be turned relative to the chuck body in the same direction in which the chuck body is rotating, thereby causing the disc or ring 15 to turn in the same direction, and move the pinions 17 and 18 bodily in the same direction, the pinions 17 and 18 meshing in differential ratios with the gears 14 and 13 respectively will produce a differential movement between these gears which will result in moving the chuck-operating part 12, herein shown as a scroll, relative to the chuck body with resultant movement of the jaws toward or from the work as the case may be.

Retardation of the ring 15 may be effected by an outward movement of the brake 41 against the interior braking surface 20 and will retard or stop rotation of the ring 15, thereby, through the differential pinions and gears, producing rotation of the jaw-operating part 12 in the opposite direction from that described in the previous paragraph.

I do not claim broadly the differential gearing as herein applied to the chuck, since this is claimed in my copending applications Serial Nos. 438,258 and 627,133.

While I have shown and described a preferred form of one embodiment of my invention, it will be understood that major changes involving omission, substitution, alteration and reversal of parts, and even changes in the mode of operation, may be made without departing from the scope of my invention, which is best defined in the following claims.

Claims:

1. A chuck comprising, in combination, a body, jaws, a jaw-operating part mounted for turning movement relative to the chuck body, differential means for turning said part relative to the chuck body and planetary means for actuating said differential means.

2. A chuck comprising, in combination, a body, jaws, a jaw-operating part mounted for turning movement relative to the chuck body, differential means for turning said part relative to the chuck body and planetary means for actuating said differential means in opposite directions.

3. A chuck comprising, in combination, a body, jaws, a jaw operating part mounted for turning movement relative to the chuck body, differential means for turning said part relative to the chuck body, planetary means for actuating said differential means in opposite directions, and brake means for selectively determining the direction of operation of said planetary means.

4. A chuck comprising, in combination, a body, jaws, a jaw-operating part mounted for turning movement relative to the chuck body, differential gears on said chuck body and part, differential pinions meshing with said gears and carried by a ring rotatable about the axis of said chuck, a gear carried by said ring, a planetary pinion meshing with said last-named gear and carried on a shaft and rotatable with the chuck body and a second gear meshing with said planetary pinion.

5. A chuck comprising, in combination, a body, jaws, a jaw-operating part mounted for turning movement relative to the chuck body, differential gears on said chuck body and part, differential pinions meshing with said gears and carried by a ring rotatable about the axis of said chuck, a gear carried by said ring, a planetary pinion meshing with said last-named gear and carried on a shaft and rotatable with the chuck body, a second gear meshing with said planetary pinion and selective brake means for retarding either of said gears meshing with said planetary pinion.

6. A chuck comprising, in combination, a body, jaws, a scroll rotatable relative to said body for actuating said jaws, a gear carried by said scroll, a gear carried by said body, a ring rotatable about said body and carrying differential pinions meshing with said gears, a gear carried by said ring, a planetary pinion carried by said body and meshing with said gear carried by said ring and a second gear meshing with said planetary pinion and rotatable relative to said body, stoppage or retardation of said second gear accelerating the rate of rotation of said ring in the direction of rotation of said body.

7. A chuck comprising, in combination, a body, jaws, a jaw-operating part mounted for turning movement relative to said chuck body, an internal gear carried by and rotatable with said part, an internal gear carried by and rotatable with said body, a ring rotatable relative to said body about an axis concentric with said body, pinion-carrying parts carried by said ring, pinions on said pinion-carrying parts meshing with said internal gears, and providing differential ratios therewith, and planetary means for actuating rotation of said ring relative to said chuck body.

In testimony whereof, I have signed my name to this specification.

WALLACE M. CUTLER.